Patented May 29, 1923.

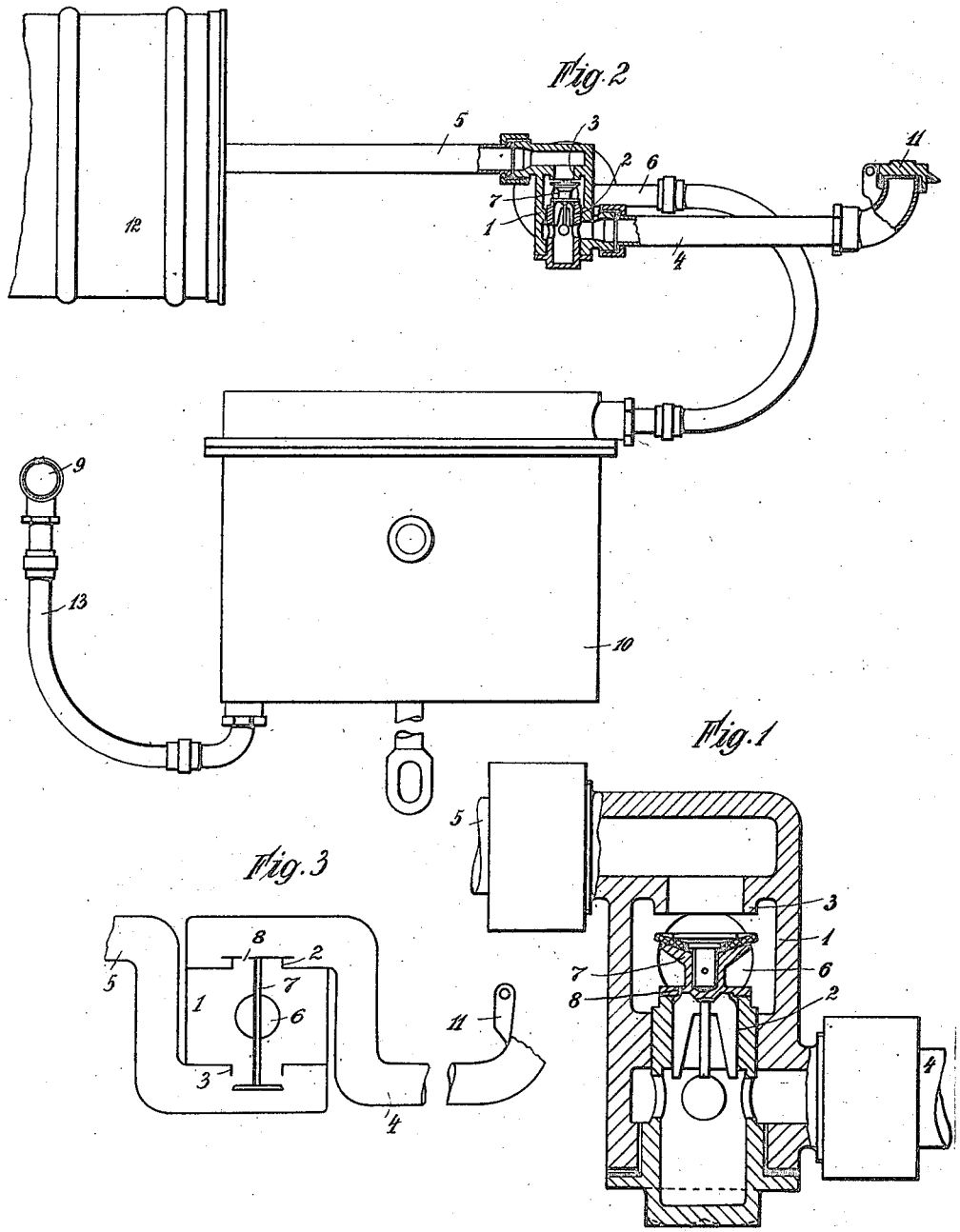

1,456,578

UNITED STATES PATENT OFFICE.

ALFRED SCHEUER, OF VIENNA, AUSTRIA, AND HUGO SCHEUER, OF ZNAIM, CZECHO-SLOVAKIA, ASSIGNORS TO THE FIRM GEBRÜDER HARDY, OF VIENNA, AUSTRIA.

PNEUMATIC BRAKE.

Application filed August 8, 1921. Serial No. 490,565.

*To all whom it may concern:*

Be it known that we, ALFRED SCHEUER, a citizen of the Republic of Austria, and resident of Vienna, Austria, and HUGO SCHEUER, a citizen of Czechoslovakia (Republic), and resident of Znaim, Czechoslovakia, have invented certain new and useful Improvements in Pneumatic Brakes, of which the following is a specification.

This invention relates to pneumatic brakes for railway vehicles of that class in which the brakes are applied by the movement of pistons in brake cylinders whenever the air pressure acting on one side of the piston is caused to differ from that acting on the opposite side of the piston and in which the brakes are released whenever the air pressures acting on opposite piston sides are equalized, and in which in each cylinder the chamber on one side of the pistons is connected to an auxiliary reservoir, usually much larger in volume than such chamber, the air pressure in such chamber being normally the same as in the auxiliary reservoir. Such brakes comprising the usual vacuum brakes as well as the usual air pressure brakes, are applied by producing a suitable change of air pressure in the train pipe and may be released throughout the train by re-establishing the normal air pressure in the train pipe, whereby the air pressures acting on the opposite sides of these pistons of all the brake cylinders are equalized, or such brakes may be released by hand by means of a special valve operating, when actuated by hand, to eqalize the air pressure on opposite sides of the pistons of individual brake cylinders or of groups of such cylinders. In the latter case the air pressure on opposite sides of the pistons of the brake cylinders is made equal to the atmospheric pressure by establishing communication of both cylinder chambers with each other and with the atmosphere.

The auxiliary reservoir associated to these brake cylinders being in the brake systems heretofore in use in permanently open connection with one of the chambers of these brake cylinders, the air pressure in the auxiliary reservoirs had also to be brought to the atmospheric pressure, and the volume of the auxiliary reservoirs being much larger than the volumes of the cylinder chambers connected therewith, the release of the brakes by hand was unduly slow. When again connected to the train pipe the pressure not only in the cylinder chambers but also in the auxiliary reservoirs had to be brought to the normal value, and this required, in view of the comparatively large volume of the auxiliary reservoir a good deal of time and expenditure of power for evacuating or charging the auxiliary reservoirs.

The object of the present invention is to avoid these inconveniences and with this object in view according to this invention, a valve is provided which so controls the connection between the auxiliary reservoir, its associated cylinder chamber and the pipe leading to the hand actuated release valve that whenever the latter is actuated the connection of the auxiliary reservoir with the associated brake cylinder chamber and said valve is broken.

In the annexed drawings by way of example an embodiment of the present invention as applied to a vacuum brake is shown. Fig. 1 is a vertical section of the double seat valve and Fig. 2 is a diagrammatic view on a smaller scale of the equipment of a vehicle embodying our invention. Figure 3 shows diagrammatically the present invention as applied to an air pressure brake.

1 is a valve casing, 2—3, are valve seats provided therein, 4 is a pipe connecting the port of the valve seat 2 with the hand actuated release valve 11, 5 is a pipe connecting the port of the valve seat 3 with the auxiliary reservoir 12, 6 indicates a pipe connecting the valve chamber 1 at a point intermediate the valve seats 2 and 3 with the upper chamber of the brake cylinder 10, the lower chamber of this cylinder is connected with the train pipe 9 by a pipe 13. The construction and arrangement of the hand operated release valve 11, the auxiliary reservoir 12, the train pipe 9 and the brake cylinder 10 are otherwise exactly the same as heretofore usual in vacuum brake apparatus, more particularly the usual automatic or nonreturn valve is interposed between the upper and the lower chamber of the brake cylinder, such nonreturn valves opening whenever the air pressure in the upper chamber exceeds that in the lower chamber, at any other times this nonreturn valve, not shown, is closed. 7 is double seat valve adapted to cooperate with either of the valve seats 2 or 3 and 8 is a small opening through the valve 7.

When the brake is applied, the pressure in the pipes 5 and 6, that is to say in the auxiliary reservoir and in the associated brake cylinder chamber are equal, the valve 7 is off the seat 3 and on the seat 2 as shown in the drawing. Through the small opening 8 in the valve also the pressure in the pipe 4 is equalized with that in the pipes 5 and 6. When then the brakes are released by a suitable change of air pressure in the train pipe and consequently in the pipe 6, the position of the parts remains unaltered the same as shown in the drawings. The brake system operates in either of these cases in the usual way. When, however, both cylinder chambers and hence also the pipe 4 are opened to the atmosphere by the hand actuated release valve above referred to the valve 7 is automatically thrown off the seat 2 and onto the seat 3 whereby the pipe 5 and hence also the auxiliary reservoir are disconnected from the pipe and brake cylinder, so that the pressure in the auxiliary cylinder remains practically unaltered as long as the brake is kept released by the hand actuated release valve. When then this valve is closed and connection is again established between the brake cylinder and train pipe and the brakes are released throughout the train by reduction of air pressure in the train pipe, the valve 7 will come off the seat 3 and fall on the seat 2 as shown in the drawing, as soon as the air pressure in the train pipe is reduced to nearly the normal value; and then the entire brake apparatus is in its normal condition.

In case of air pressure brakes the arrangement above described may remain unaltered except that the arrangement shown in Figures 1 and 2, as will be obvious to persons skilled in the art, is reversed, that is to say the valve seat 3 is located below the valve seat 2 and the valve seats proper are arranged between the valve bodies as will be obvious to persons skilled in the art.

As shown in Figure 3, the operation is exactly the same as that above described. Normally the parts are in the position shown in Figure 3, equal pressure higher than the atmosphere existing in the reservoir (12) pipe (5), valve casing (1) and pipe (4). When the hand valve (11) is open for releasing the brake, the valve (7) is lifted off of its seat (2) and forced on to a seat (3) owing to the pressure in the pipe (4) being suddenly reduced, and thereby the reservoir (2) is disconnected from the pipe (6) leading to the brake cylinder.

The constructional details may be varied within wide limits without departing from the essence of the invention.

Claims.

1. In pneumatic brakes a valve casing a pipe connecting the said valve casing with a brake cylinder, another pipe connecting the valve casing with the auxiliary reservoir and a third pipe connecting the valve casing with the hand actuated brake release valve, a movable valve within the said valve casing adapted to establish in one position communication between the first named and the last named pipe and to simultaneously shut the second named pipe and to establish in another position communication between the first named and the second named pipe and to simultaneously shut the third named pipe and means for moving the said valve into the first of these positions on establishing a predetermined pressure in the third named pipe and means for returning the said valve into the second of these positions.

2. In pneumatic brakes a valve casing a valve seat, another valve seat opposite to the first named valve seat, a pipe communicating with the port of the first named valve seat and the auxiliary reservoir, a pipe communicating with the port of the last named valve seat and the hand actuated brake release valve, a port in the valve casing located between the said valve seats and leading to the brake cylinder, a valve adapted to be seated on either of the said seats, means for seating the said valve on the first named valve seat on establishing a predetermined pressure in the second named pipe and means for returning the said valve onto the second valve seat.

3. In vacuum brakes a valve casing an upper valve seat and a lower valve seat in line with the upper one, a pipe establishing communication between the upper valve seat port and the auxiliary reservoir, a pipe establishing communication between the lower valve seat port and the hand actuated brake release valve, a port in the valve casing located between the said valve seats and communicating with the brake cylinder and an automatic valve adapted to be seated on the upper valve seat on establishing atmospheric pressure in the second named pipe and to be seated on the lower seat on evacuating the second named pipe.

In testimony whereof we affix our signatures in presence of two witnesses.

ING. ALFRED SCHEUER.
HUGO SCHEUER.

Witnesses:
ARTHUR BAUMANN,
JOHANN BINZ.